C. O. WOLD.
CULVERT PIPE.
APPLICATION FILED OCT. 22, 1908.
912,638.
Patented Feb. 16, 1909.
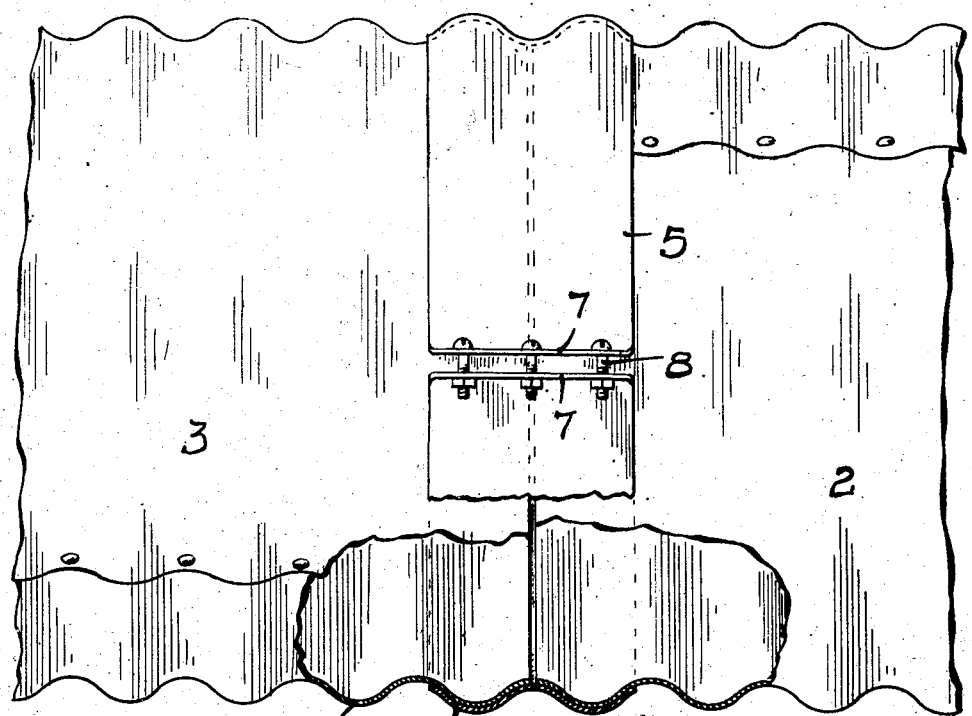
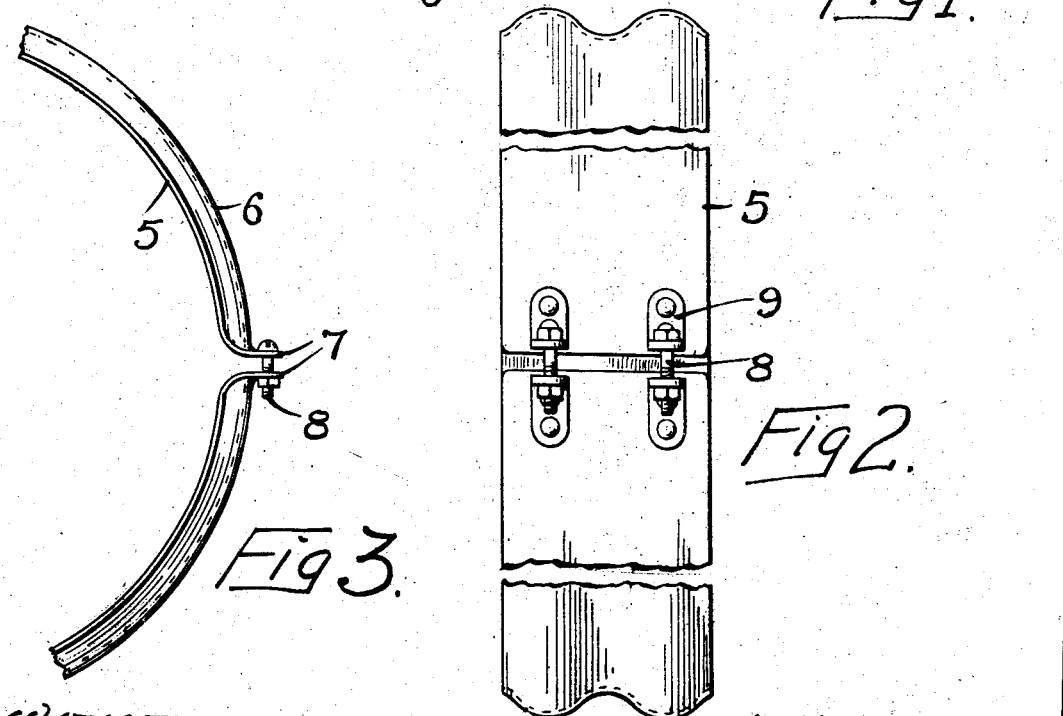
WITNESSES
INVENTOR
CARL O. WOLD
HIS ATTORNEYS

UNITED STATES PATENT OFFICE.

CARL O. WOLD, OF MINNEAPOLIS, MINNESOTA.

CULVERT-PIPE.

No. 912,638.　　　Specification of Letters Patent.　　　Patented Feb. 16, 1909.

Application filed October 22, 1908. Serial No. 459,057.

*To all whom it may concern:*

Be it known that I, CARL O. WOLD, of Minneapolis, Hennepin county, Minnesota, have invented certain new and useful Improvements in Culvert-Pipe, of which the following is a specification.

The object of my invention is to provide a simple inexpensive means for uniting the abutting ends of pipe sections together, and particularly sections having annular corrugations formed therein, the pipe being designed for culvert and similar work.

The invention consists generally in various constructions and combinations all as hereinafter described, and particularly pointed out in the claims.

In the accompanying drawings forming part of this specification, Figure 1, is a side view partially in section of the abutting ends of two pipe sections showing my improved means for securing them together, Fig. 2, is a side view of the band illustrating the means for securing its ends together, Fig. 3, is a view showing the band and a modified means for securing its ends together.

In the drawing, 2 and 3 represent abutting sections of pipe, each composed of plates having corrugations formed therein and their edges riveted together to form the larger sizes of pipe. In the smaller sizes a single plate is sufficient. The number of plates used in a section will of course depend upon the diameter of the pipe. Corrugations indicated by reference numeral (4) extend around the pipe and greatly strengthen it to resist a crushing strain. The ends of the pipe sections are brought together as indicated in Fig. 1, and a band 5 having corrugations 6 formed therein, is provided to inclose the ends of the sections and overlap the outer corrugating therein; that is, the band 5 is of sufficient width to bridge the joint between the sections and embrace the first corrugation in the end of each section. The edges of the band extend into the depression formed between the first corrugation and the second one, and when the ends of the band are drawn together, and locked, the sections will be securely held against separation and the joint will also be braced and strengthened. The ends of the band are turned outwardly forming lips 7 through which bolts 8 pass for drawing said ends together and clamping the band securely around the pipe sections. I have found this to be an extremely simple and efficient means for connecting the ends of the pipe sections. No telescoping is required. Consequent loss in the length of the pipe sections is avoided and with the band of sufficient width to cover a corrugation on each section, the joint will be rigidly held and there will be no danger of the sections pulling apart.

In Fig. 2, I have shown a modification in the manner of securing the ends of the bands together, adapted particularly for the heavier sizes of pipe and consisting of brackets 9 secured to the ends of the band having holes into which the connecting bolts are inserted and the ends of the band drawn together.

The band which I prefer to employ is cut off from one end of a pipe section or is formed with the same diameter as said section, so that when it is placed on the outside of the pipe sections, its ends will be separated a sufficient distance to allow the bolts to draw the said ends together and clamp the joint.

In some instances, the pipe sections may be cut or the corrugations formed therein so that the annular depressions will be formed at the ends of the sections instead of the ribs of the corrugations. In that case, the encircling band would have its depressions correspondingly formed so that they would fit into or nest with the grooves or depressions in the ends of the sections. I have found this to be an economical method of connecting the pipe sections. No riveting is required and it is merely necessary to adjust the pipe sections end to end, inclose them with the band and draw the ends of the band together. The work of uniting the sections is then completed and is easily and expeditiously performed. It is also to be noted, that there are no special ribs or corrugations formed in the ends of the pipe nor are they flared by any special process. The sections are made up in the ordinary way of the corrugated plates and their abutting ends united by the embracing clamp plate or band.

I claim as my invention:—

1. The combination, with two pipe sections, placed end to end but without lapping by one another, each section having annular corrugations formed therein, extending at intervals from end to end of the sections, of a circular band, arranged to inclose the joint at the abutting ends of said sections and also having corrugations on each side of its middle line, which are adapted to nest with and embrace the end corrugation of said pipe sections, thereby preventing separation of said sections, the corrugations in said band corresponding to those in said sections and the diameter of said band when its ends are brought together, corresponding substantially to the diameter of said sections, and means for drawing the ends of said band together to clamp it on the joint.

2. A culvert composed of pipe sections placed end to end, each section being made up of plates riveted together, and having annular corrugations formed therein; a band having corrugations extending lengthwise thereof on each side of its longitudinal center, said corrugations over-lapping and embracing respectively the corrugations in the ends of said pipe sections and said band having its ends turned outwardly forming lips thereon and means passing through said lips for drawing the ends of said band together, substantially as described.

In witness whereof, I have hereunto set my hand this 13th day of October 1908.

CARL O. WOLD.

Witnesses:
RICHARD PAUL,
J. A. BYINGTON.